United States Patent [19]

Cordemans de Meulenaer et al.

[11] Patent Number: 4,804,131

[45] Date of Patent: Feb. 14, 1989

[54] PROCESS OF USE OF AN ELECTROACOUSTICAL VIBRATOR DEVICE AND PLANT FOR CARRYING OUT THIS PROCESS

[75] Inventors: Eric D. Cordemans de Meulenaer, Wezembeek-Oppem; Baudouin O. Hannecart, La Roche en Ardenne, both of Belgium

[73] Assignee: Undatim Ultrasonics, Brussels, Belgium

[21] Appl. No.: 120,535

[22] Filed: Nov. 13, 1987

[30] Foreign Application Priority Data

Nov. 18, 1986 [BE] Belgium ............................ 0/217426

[51] Int. Cl.$^4$ ............................................. B23K 20/10
[52] U.S. Cl. ..................................... 228/110; 228/1.1
[58] Field of Search ...................... 228/56.2, 1.1, 110

[56] References Cited

U.S. PATENT DOCUMENTS

| | | | |
|---|---|---|---|
| 3,955,740 | 5/1976 | Shoh | 228/110 |
| 4,006,707 | 2/1977 | Denslow | 228/56.2 |
| 4,227,959 | 10/1980 | Brown | 228/1.1 |
| 4,326,903 | 4/1982 | Summo | 228/110 |
| 4,527,727 | 7/1985 | Renshaw | 228/1.1 |
| 4,540,113 | 9/1985 | Shimazaki | 228/1.1 |

Primary Examiner—M. Jordan
Attorney, Agent, or Firm—Cushman, Darby & Cushman

[57] ABSTRACT

A process for using an electroacoustical vibrator device arranged on a support and intended to be used in particular in machining and welding of elements, characterized in that it consists of modifying during use of the electroacoustical vibrator device the position of the latter with respect to its support in order that the fixing area of this device on said support substantially coincides with a vibration node.

FIG. 1.

11 Claims, 3 Drawing Sheets

PROCESS OF USE OF AN ELECTROACOUSTICAL VIBRATOR DEVICE AND PLANT FOR CARRYING OUT THIS PROCESS

This invention has for its object a process for using an elctroacoustical vibrator device arranged on a support and intended to be used in particular in machining and welding of elements.

It is known that the more the oscillations of an electroacoustical vibrator device are free the more the efficiency of this device is better and it is also known that this result is only obtained when fixing the vibrator device on a support at the location of one of the vibration nodes.

During the use of the vibrator device, the position of most of said nodes varies.

Up to now, in order to reach a relatively satisfying efficiency, the vibration frequency of said vibrator device could only vary within a very limited range from a reference frequency due to the fixed position of the vibrator device with respect to its support. This way of proceeding has the drawback to allow a use only in a reduced band width with a substantial loss of electroacoustical efficiency.

The invention has for its object to remedy this drawback and to provide a process of use of an electroacoustical vibrator device so that the latter operates with a high efficiency and in a uniform manner. This is particularly important due to the fact that use of said device in a quick way and with the as higher as possible efficiency more particularly concerns materials which are hard and brittle or the working of which is particularly slow.

To this end, according to the invention, this process consists of modifying during use of the electroacoustical vibrator device the position of the latter with respect to its support in order that the fixing area of this device on said support substantially coincides with a vibration node.

The invention has also for its object to provide a plant for carrying out said process.

According to the invention, this plant comprises a support which bears an electroacoustical vibrator device, means for fixing said device on the support, said means being arranged so as to allow the relative position of the vibrator device to be modified with respect to the support thereof, and means for analysing the vibration frequency of the vibrator device and for guiding the vibrator device position with respect to the support thereof.

Other details and features of the invention will become apparent from the description of the drawings enclosed with the present specification, said drawings illustrating and showing, by way of non limitative examples, the above-defined process as well as two particular embodiments of the plant according to the invention.

In the several figures, same reference numerals refer to identical or similar elements.

Figure 1:
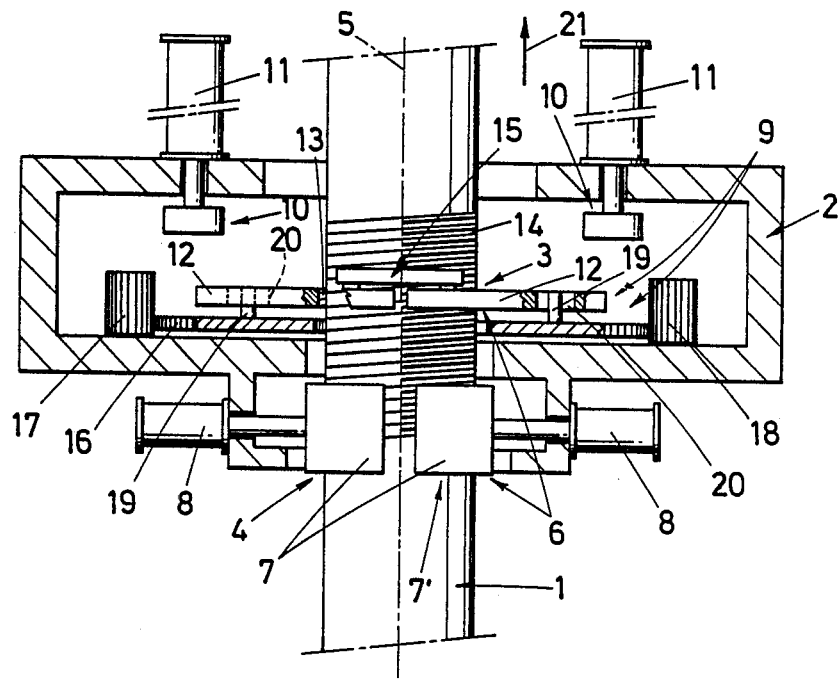
FIG. 1 is a schematic, partly broken away, elevation view in cross-section of support and fixing means of the electroacoustical vibrator device according to the invention.

As shown in the drawings, the process according to the invention has in view during use of the electroacoustical vibrator device 1 to modify the position thereof with respect to its support 2 so that the fixing area 3 of device 1 to said support 2 substantially coincides with a node of vibrations in order to bring the device into ideal working conditions for its whole use period.

To this end, the resonant vibration frequency of the vibrator device 1 is detected and when a deviation of this frequency, of a predetermined value, is noted, which in fact corresponds to a change of location of the vibration node, the vibrator device 1 is secured against motion in 4 and outside the fixing area 3 with respect to the support 2. The fixing area 3 is then made movable with respect to the vibrator device 1, while keeping a driving engagement with the latter along its longitudinal axis 5. On the basis of the frequency deviation such as found, the fixing area 3 is moved along the device 1 and the axis 5. in the direction of the new position of the vibration node. When this new position coincides with that of the fixing area 3, the latter is interlocked with the device 1 and the support 2, while said device 1 is then released in 4.

In order to allow the position of the fixing area 3 to be adapted to that of a vibration node, the reference frequency corresponding to the fixing of the vibrator device 1 at the location of this node must be determined. In the course of use of the device 1, the resonant vibration frequency is analysed, preferably in a continuous way, this frequency is compared to the reference frequency which has been determined and the comparison result is used in order to modify the fixing zone 3 of the device 1 with respect to the support 2 in order to bring it in concordance with the above-mentioned vibration node.

To determine the reference frequency, the equivalent electric circuit of the vibrator device is analysed in order to determine the minimum impedance. The corresponding frequency is then recorded, which constitutes the reference frequency which is used to carry out a movement of the fixing area to the corresponding vibration node.

On position variations of the support 2, contact of the vibrator device 1 and of the article to be machined can be detected thanks to the impedance variation resulting therefrom in the equivalent electric circuit of the vibrator device 1.

The plant according to the invention, which is partly shown in the drawings, for carrying our the above-described process comprises the support 2, which bears the electroacoustical device 1, means 6 for fixing said device 1 on the support 2, said means being arranged in order to allow the position of the vibrator device 1 to be modified with respect to the support 2, and means, not shown and made of electronic components, which are known per se, for analysing the vibration frequency of the vibrator device 1 and for guiding the position of the latter with respect to its support 2.

These fixing means 6 comprise members 7' which are fixed with respect to support 2 and arranged aside from the fixing area 3, said members being formed of jaws 7 which grip around the vibrator device 1 by means of jacks 8, in order to temporarily secure this device against motion with respect to the support 2 when the position of the fixing area 3 is modified. These means also comprise members 9 which are movable with respect to the support 2 and which will be described hereinafter, said means being arranged to move with respect to this support 2 and to the vibrator device in order to take a position substantially at the location of the abovementioned vibration node, said means 6 advantageously comprising blocking means 10 which are controlled by jacks 11 and arranged to bear on the movable members 9 in order to secure them against motion with respect to the support 2 where said members 9 are in their position corresponding to the working position of the elctroacoustical vibrator device 1.

In the embodiment illustrated by FIG. 1, said movable members 9 are formed of two jaws 12 intended to surround the vibrator device 1 and the area 13 of which is tapped in order to cooperate with a threaded area 14 of the device 1. Said members 9 also comprise means 15, such as jacks, arranged to move the jaws 12 apart by such a distance that the vibrator device is released from the jaws 12 and that the latter can move by following the thread of the area 14 under the action of a gear ring 16 which is driven by a gear 17 controlled by a motor, not shown, and which is guided by means of a gear 18 freely rotatable around its axis. The linking between jaws 12 and gear ring 16 is made by means of lugs 19 which are fixed to the gear ring and cooperate with holes 20 in jaws 19.

Said movable members 9 are arranged to move in the direction of the arrow 21 in order to adapt the fixing area 3 to the vibration node of the device 1, which moves due to wear of the device tool in the direction of this arrow 21. In this particular case, the operational sequence is as follows : jaws 7 forming part of members 7' which are fixed with respect to the support 2 grip around the device 1 in order to secure it against motion along its axis 5 and to prevent its rotation about this axis, members 30 of blocking means 10 are moved apart from the jaws 12, the latter are moved apart from the device 1 while maintained their tapped area 13 in such a position that the latter can cooperate with the threaded area 14 of the device 1, jaws 12 are driven by the gear ring 16 in the direction of the arrow 21 until they are located opposite the position of the vibration node, jaws 12 are then brought back to the device 1 in order to block said jaws with respect to this device, jaws 7 release the device 1 and blocking means 10 are brought back into contact with the jaws 12 in order to apply the latter on the gear ring 16 which will be applied itself on support 2. In order to prevent a too rough impact of these elements with the support 1 when jaws 7 release the device 1, a compressible elastic element placed between at least the gear ring 16 and the support 2 may be provided.

Figure 2:
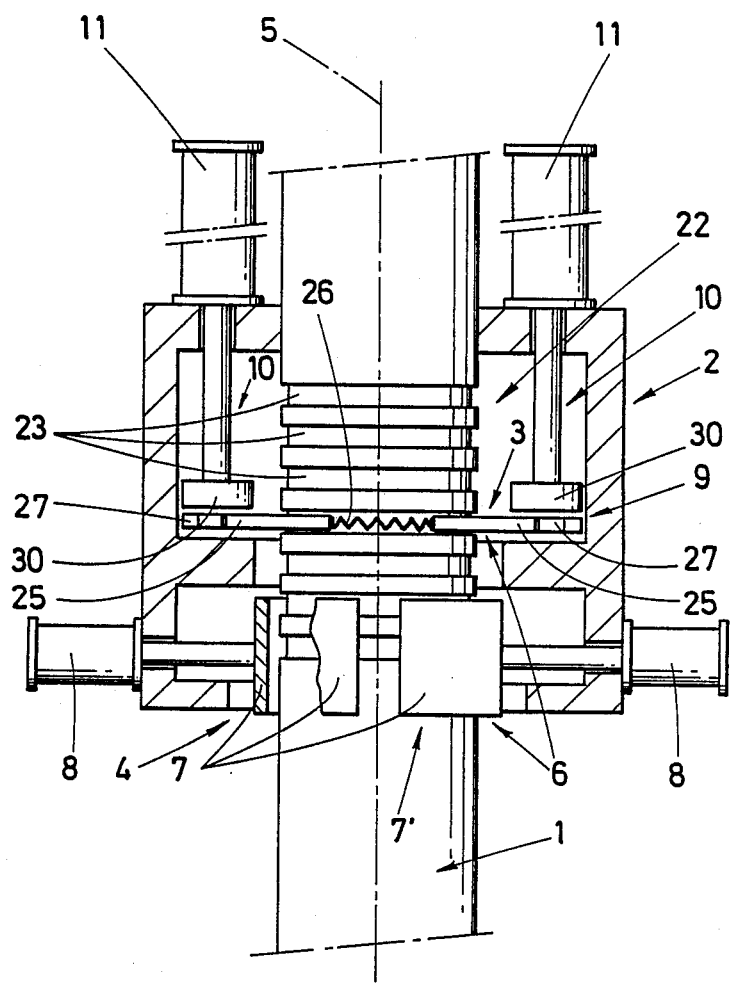
FIG. 2 is a view similar to FIG. 1 and illustrating a variant of the support and fixing means of the vibrator device such as shown by FIG. 1.
Figure 3:
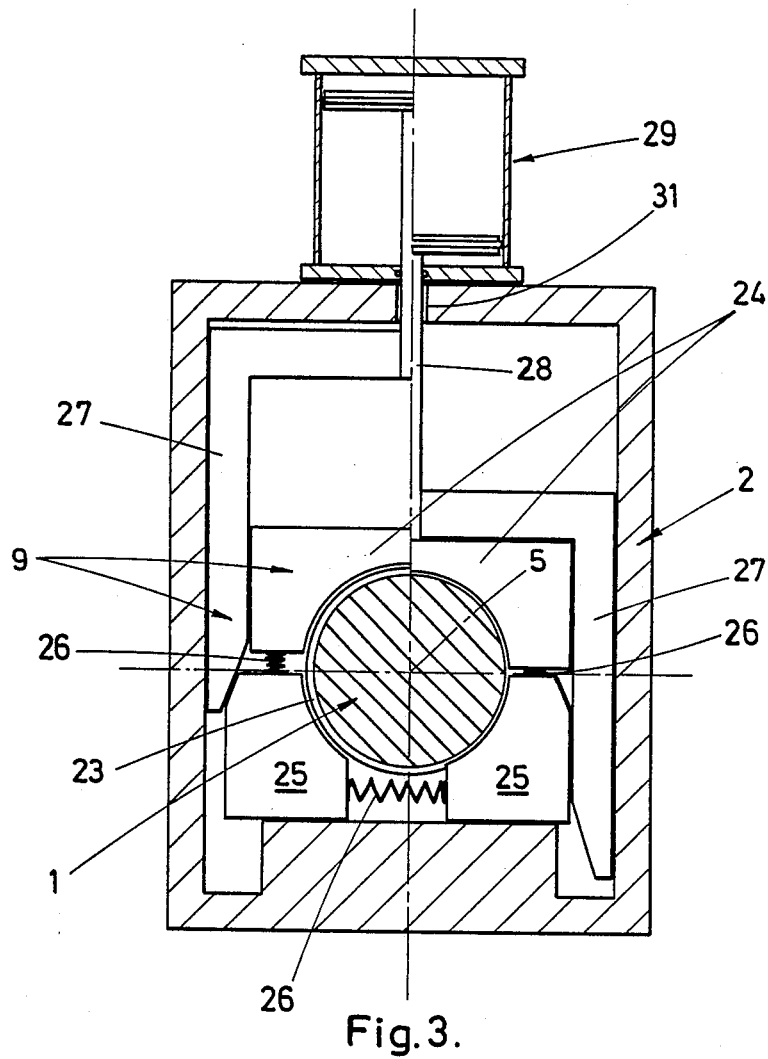
FIG. 3 is a cross-sectional top view corresponding to FIG. 2.

In this embodiment of the plant such as shown in FIGS. 2 and 3, members 9 which are movable with respect to the support 2, in both directions along axis 5, are formed of a set of jaws 24 and 25 which are guided in the support 2 and between which springs are provided, which are arranged for normally moving said jaws apart, and of a control slide 27 of the jaws 24 and 25, this slide being guided in the support 2 and borne by the rod 28 of a jack 29, which is guided on the support 2 in order to be able to move through a hole 31 provided in the support along a direction parallel to the axis 5 of the device 1, without rotating about this axis 5. Jaws 24 and 25, control slide 27 and jack 29 are arranged in order that jaws 24 and 25 can take two extreme positions, i.e. a first extreme position in which said jaws are entered into annular grooves 23, and a second extreme position in which they are disengaged from said grooves 23. Thanks to the springs 26 and the configuration of jaws 24 and 25, the latter when they are in their first extreme position (standstill position of the vibrator device) do not enter into contact, so that when said jaws are entered into annular grooves 23, the axis 5 of the vibrator device 1 is always in the same position. When jaws 24 and 25 are in the first extreme position, members 30 of blocking means, which are driven by jacks 11, come to bear on the jaws 24 and 25 and the slide 27 in order to apply them on the support 2.

The operating mode of fixing means 6 of the plant such as illustrated in FIGS. 2 and 3 is similar to that of fixing means 6 of the plant illustrated in FIG. 1 and described hereinabove.

It has to be understood that the invention is in no way limited to the hereinabove described embodiments and that many modifications may be brought thereto without departing from the scope of the present patent.

What is claimed is:

1. A process for using an electroacoustical vibrator device arranged on a support and intended to be used in particular in machining and welding of elements, characterized in that comprising modifying during use of the electroacoustical vibrator device the position of the latter with respect to its support in order that the fixing area of this device on said support substantially coincides with a vibration node.

2. A process as claimed in claim 1, wherein modification of the position of the electroacoustical vibrator device is made in a discontinuous way, this modification being carried out when the vibration frequency varies by a predetermined value.

3. A process as claimed in claim 2, wherein in order to carry out said position modification, the electroacoustical vibrator device is secured against motion at a location situated outside its above-mentioned fixing area to its support, this fixing area is made movable with respect to the vibrator device with or without operational disengagement with respect to the latter, a relative motion of the fixing area and of the device is caused along the axis of this device, in order that their respective position substantially coincides with the next position of the vibration node, the fixing area is again secured against motion with respect to the vibrator device, the latter is released at the above-mentioned location outside its fixing area.

4. A process as claimed in claim 1, wherein the reference frequency corresponding to fixing of the vibrator device at the location of a vibration node of the latter in the course of use of the device is determined, the resonant vibration frequency is analysed, the latter frequency is compared with the reference frequency and the comparison result is used in order to modify the fixing area of the electroacoustical vibrator device with respect to its support so that said area substantially coincides with a vibration node.

5. A process as claimed in claim 4, wherein the equivalent electric circuit of the vibrator device is analysed in order to determine the minimum impedance thereof, the corresponding frequency which is the reference frequency is recorded, the latter is used to carry out a change of location of the fixing area towards the corresponding vibration node and this area is maintained fixed with respect to this node.

6. An electroacoustical vibrator apparatus for use in particular in machining and welding of elements comprising:
an electroacoustical vibrator device;
a support for said device;

means for fixing said device on said support so as to allow modification of the position of said device relative to said support; and means for analyzing the vibration frequency of said device and for modifying said position to be substantially located at a vibration node.

7. Apparatus as claimed in claim 6, wherein above mentioned fixing means comprise members which are fixed with respect to the support and are arranged to temporarily secure against motion the vibrator device with respect to the support at the moment of a modification of position such as hereinbefore, and members which are movable with respect to the support and are arranged to move with respect to the latter and to the vibrator device in order to substantially take a position at the location of a vibration node.

8. Apparatus as claimed in claim 7, wherein above-mentioned fixing means comprise means for blocking said movable members on the support, when said movable members are in their position corresponding to the working position of the electroacoustical vibration device.

9. Apparatus as claimed in claim 7, wherein said members which are fixed with respect to the vibrator device and are arranged to temporarily secure against motion of the vibrator device, along a direction parallel to its axis and in rotation about this axis, with respect to the support comprise two or more jaws which are shaped so as to bear on the external face of the vibrator device and are each fixed to the end of the piston rod of a jack assembled with the support and the axis of which is perpendicular to the axis of the vibrator device, axes of the jacks being merged, while said members which are movable with respect to the support are formed, on the one hand, of two or more jaws which are movable perpendicularly to the axis of the vibrator device and along a direction parallel to this axis, said jaws being controlled by jacks, the area of these jaws which has to cooperate with the vibrator device being tapped, while the area of the vibrator device with which said jaws cooperate is threaded, the stroke of these jacks being regulated so that when said jaws release the vibrator device, the thread of the above-mentioned tapped area is always engaged with the thread of the threaded area of the vibrator device, and, on the other hand, of means for driving these jaws into rotation about the axis of the vibrator device, said driving means comprising a gear ring which is coaxial to this device, one or more gears for driving said gear ring, said gears being arranged on the support, and a linking of this gear ring and said jaws by means of lugs.

10. Apparatus as claimed in claim 7, wherein the vibrator device comprises an area provided with annular grooves which are regularly distributed along its axis, the above-mentioned members which are fixed with respect to the support and are arranged in order to temporarily secure the vibrator device against motion along a direction parallel to its axis and in rotation about the latter, with respect to the support, comprising two or more jaws which are shaped so as to bear on the external face of the vibrator device and are each fixed at the end of the piston rod of a jack which is assembled with the support and the axis of which is perpendicular to the axis of the vibrator device, axes of the jacks being merged, while above-mentioned members which are movable with respect to the support are formed of a set of jaws which are guided in the support and between which springs are provided, said springs being arranged to normally bring said jaws apart, and of a control slide for these jaws, said slide being guided in the support and borne by the rod of a jack which is guided on the support to be able to move along a direction parallel to the axis of the vibrator device, the jaws, control slide and jack being arranged so that jaws can take two positions, namely a first extreme position in which they are located in the above-mentioned annular grooves and a second extreme position in which they are disengaged from said grooves.

11. Apparatus as claimed in claim 8, wherein the above-mentioned blocking means are formed of members which are each controlled by a jack fixed to the support and arranged to bear either on said jaws, or on the set of jaws and the control slide, in order to secure them against motion with respect to the support when movable jaws and the set jaws are in their standing position of the vibrator device.

* * * * *